(12) United States Patent
Mandel et al.

(10) Patent No.: US 10,682,796 B2
(45) Date of Patent: Jun. 16, 2020

(54) CONSTANT PRESSURE FILAMENT DRIVER FOR EXTRUDER HEADS IN THREE-DIMENSIONAL OBJECT PRINTERS

(71) Applicant: Xerox Corporation, Norwalk, CT (US)

(72) Inventors: Barry P. Mandel, Fairport, NY (US); Peter J. Nystrom, Webster, NY (US); Christopher G. Lynn, Wolcott, NY (US); Robert A. Clark, Williamson, NY (US); David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 335 days.

(21) Appl. No.: 15/334,721

(22) Filed: Oct. 26, 2016

(65) Prior Publication Data

US 2018/0111306 A1    Apr. 26, 2018

(51) Int. Cl.
   *B29C 48/255* (2019.01)
   *B29C 64/386* (2017.01)
   (Continued)

(52) U.S. Cl.
   CPC ........ *B29C 48/2552* (2019.02); *B29C 48/252* (2019.02); *B29C 48/266* (2019.02); *B29C 48/802* (2019.02); *B29C 48/92* (2019.02); *B29C 64/106* (2017.08); *B29C 64/118* (2017.08); *B29C 64/209* (2017.08); *B29C 64/241* (2017.08); *B29C 64/295* (2017.08);
   (Continued)

(58) Field of Classification Search
   CPC . B29C 47/08; B29C 47/0801; B29C 47/0813; B29C 47/0866; B29C 47/80; B29C 47/802; B29C 47/92; B29C 64/106; B29C 64/118; B29C 64/209; B29C 64/241; B29C 64/295; B29C 64/314; B29C 64/343; B29C 64/386; B29C 2947/9239; B29C 2947/92266; B29C 2947/92019; B29C 2947/92761; B29C 2947/92885; B29C 64/321; B29C 48/252; B29C 48/2552; B29C 48/266; B29C 48/802; B29C 48/92; B29C 2948/92019; B29C 2948/92266; B29C 2948/9239; B29C 2948/92761; B29C 2948/92885; B33Y 10/00; B33Y 30/00
   See application file for complete search history.

(56) References Cited

U.S. PATENT DOCUMENTS

3,063,361 A * 11/1962 Gehrke ................. B30B 11/227
                                                   100/139
3,111,707 A * 11/1963 Buckley ................ B29C 47/92
                                                   425/145
(Continued)

*Primary Examiner* — Xiao S Zhao
*Assistant Examiner* — Joseph S Leyson
(74) *Attorney, Agent, or Firm* — Maginot Moore & Beck LLP (57) ABSTRACT

An additive manufacturing system includes a slip clutch coupled to an actuator of a mechanical driver that feeds solid extrusion material into a heater for supplying thermoplastic material to a manifold in an extruder head. A speed of the actuator can be set to enable the actuator to operate at a rotational speed that is slightly greater than the rotational speed of the mechanical mover. This configuration enables the pressure of the thermoplastic material in the manifold of the extruder head to be in a predetermined range no matter how many nozzles are opened in the extruder head.

10 Claims, 4 Drawing Sheets

(51) Int. Cl.
*B29C 48/92* (2019.01)
*B29C 64/209* (2017.01)
*B29C 64/343* (2017.01)
*B29C 64/321* (2017.01)
*B29C 64/118* (2017.01)
*B29C 64/241* (2017.01)
*B29C 64/295* (2017.01)
*B29C 48/25* (2019.01)
*B29C 48/80* (2019.01)
*B29C 64/106* (2017.01)
*B33Y 10/00* (2015.01)
*B33Y 30/00* (2015.01)
*B29K 101/12* (2006.01)

(52) U.S. Cl.
CPC .......... *B29C 64/321* (2017.08); *B29C 64/343* (2017.08); *B29C 64/386* (2017.08); *B29C 2948/92019* (2019.02); *B29C 2948/9239* (2019.02); *B29C 2948/92266* (2019.02); *B29C 2948/92761* (2019.02); *B29C 2948/92885* (2019.02); *B29K 2101/12* (2013.01); *B33Y 10/00* (2014.12); *B33Y 30/00* (2014.12)

(56) References Cited

U.S. PATENT DOCUMENTS

| | | | |
|---|---|---|---|
| 5,303,141 A * | 4/1994 | Batchelder | B29C 41/36 700/29 |
| 2004/0043094 A1 * | 3/2004 | Hauck | A21C 11/20 425/208 |
| 2015/0045182 A1 * | 2/2015 | Rechter | B29C 47/0805 477/12 |
| 2015/0314531 A1 * | 11/2015 | Mark | B33Y 70/00 264/241 |
| 2017/0203507 A1 * | 7/2017 | Leavitt | B33Y 30/00 |

* cited by examiner

CONSTANT PRESSURE FILAMENT DRIVER FOR EXTRUDER HEADS IN THREE-DIMENSIONAL OBJECT PRINTERS

TECHNICAL FIELD

This disclosure is directed to extruders used in three-dimensional object printers and, more particularly, to extruders that are fed material by an extrusion material supply system.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use extruder heads that soften or melt extrusion material, such as ABS plastic, into thermoplastic material and then emit the thermoplastic material in a predetermined pattern. The printer typically operates the extruder head to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

The thermoplastic material is stored in a manifold in the extruder head. The amount of thermoplastic material emitted by the one or more nozzles in the extruder head varies during production of an object. These variations are caused by the number of nozzles in the extruder head, the rate at which the extruder head and object supporting surface move relative to one another, the area of an object being formed, the temperature of the material, and the like. The fluctuating flow rate of thermoplastic material in the manifold affects the pressure of the material for its delivery through the nozzle or nozzles. A pressure within a suitable range would be preferred to enable each nozzle to emit a properly formed stream of the material. An extruder head that maintains a pressure in the manifold within a predetermined range during extrusion of the thermoplastic material would be beneficial.

SUMMARY

A new apparatus enables the pressure of the thermoplastic material stored in a manifold of an extruder head to be maintained within a predetermined range. The apparatus includes an extruder head having a manifold configured to store thermoplastic material and at least one nozzle through which thermoplastic material from the manifold can be emitted, a heater having a channel through which extrusion material can pass and at least one heating element configured to thermally treat the extrusion material in the channel to melt the extrusion material to form thermoplastic material, the channel in the heater being fluidly connected to the manifold in the extruder head to enable the thermoplastic material to enter the manifold, an actuator having an output shaft, a mechanical mover operatively connected to the output shaft of the actuator to enable the actuator to operate the mechanical mover, the mechanical mover being positioned to apply a force to the extrusion material to move the extrusion material from a supply of extrusion material to the channel in the heater when the actuator operates the mechanical mover, and a slip clutch operatively connected to the output shaft of the actuator to limit a force exerted by the mechanical mover to the extrusion material.

A new method enables the pressure of the thermoplastic material stored in a manifold of an extruder head to be maintained within a predetermined range. The method includes operating a mechanical mover to exert a force within a predetermined range to move extrusion material into a heater, operating the heater to melt the extrusion material and form thermoplastic material that moves towards an extruder head that extrudes the thermoplastic material, and limiting with a slip clutch a force exerted by the mechanical mover to the extrusion material.

BRIEF DESCRIPTION OF THE DRAWINGS

The foregoing aspects and other features of systems that feed extruder heads are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

As used herein, the term "extrusion material" refers to a material that is softened or melted to form thermoplastic material to be emitted by an extruder head in an additive manufacturing system. The extrusion materials include, but are not strictly limited to, both "build materials" that form permanent portions of the three-dimensional printed object and "support materials" that form temporary structures to support portions of the build material during a printing process and are then optionally removed after completion of the printing process. Examples of build materials include, but are not limited to, acrylonitrile butadiene styrene (ABS) plastic, polylactic acid (PLA), aliphatic or semi-aromatic polyamides (Nylon), plastics that include suspended carbon fiber or other aggregate materials, electrically conductive polymers, and any other form of material that can be thermally treated to produce thermoplastic material suitable for emission through an extruder head. Examples of support materials include, but are not limited to, high-impact polystyrene (HIPS), polyvinyl alcohol (PVA), and other materials capable of extrusion after being thermally treated. In some extrusion printers, the extrusion material is supplied as continuous elongated strand of material commonly known as a "filament." This filament is provided in a solid form by one or more rollers pulling the extrusion material filament from a spool or other supply and feeding the filament into a heater that is fluidly connected to a manifold within the extruder head. The heater softens or melts the extrusion material filament to form a thermoplastic material that flows into the manifold. When a valve positioned between a nozzle and the manifold is opened, a portion of the thermoplastic material flows from the manifold through the nozzle and is emitted as a stream of thermoplastic material. As used herein, the term "melt" as applied to extrusion material refers to any elevation of temperature for the extrusion material that softens or changes the phase of the extrusion material to enable extrusion of the thermoplastic material through one or more nozzles in a printhead during operation of a three-dimensional object printer. The melted extrusion material is also denoted as "thermoplastic material" in this document. As those of skill in the art recognize, certain amorphous extrusion materials do not transition to a pure liquid state during operation of the printer.

As used herein, the terms "extruder head" refers to a component of a printer that melts extrusion material in a single fluid chamber and provides the melted extrusion material to a manifold connected to one or more nozzles. Some extruder heads include a valve assembly that can be electronically operated to enable thermoplastic material to flow through nozzles selectively. The valve assembly enables the independent connecting of one or more nozzles to the manifold to extrude the thermoplastic material. As used herein, the term "nozzle" refers to an orifice in an extruder head that is fluidly connected to the manifold in an extruder head and through which thermoplastic material is emitted towards an image receiving surface. During operation, the nozzle can extrude a substantially continuous linear arrangement of the thermoplastic material along the process path of the extruder head. A controller operates the valves in the valve assembly to control which nozzles connected to the valve assembly extrude thermoplastic material. The diameter of the nozzle affects the width of the line of extruded thermoplastic material. Different printhead embodiments include nozzles having a range of orifice sizes with wider orifices producing lines having widths that are greater than the widths of lines produced by narrower orifices.

As used herein, the term "manifold" refers to a cavity formed within a housing of an extruder head that holds a supply of thermoplastic material for delivery to one or more nozzles in the printhead during a three-dimensional object printing operation. A system, which is described in more detail below, is configured to feed extrusion material into a heater at a rate that maintains a pressure on the thermoplastic material in the manifold within a predetermined range. That pressure enables the rate at which the one or more nozzles extrude the thermoplastic material to be regulated. Specifically, even though the valves connected to the multiple nozzles are activated and deactivated on an individual basis, the filament feed system enables the manifold to supply thermoplastic material through any activated valves to nozzles in the extruder head at a substantially constant rate even as the number of activated valves changes during a printing operation.

As used herein, the term "arrangement of extrusion material" refers to any pattern of the extrusion material that the extrusion printhead forms on an image receiving surface during a three-dimensional object printing operation. Common arrangements of extrusion material include straight-line linear arrangements of the extrusion material and curved arrangements of the extrusion material. In some configurations, the extruder head extrudes the thermoplastic material in a continuous manner to form the arrangement with a contiguous mass of the extrusion material while in other configurations the extruder head operates in an intermittent manner to form smaller groups of thermoplastic material that are arranged along a linear or curved path. The three-dimensional object printer forms various structures using combinations of different arrangements of the extrusion material. Additionally, a controller in the three-dimensional object printer uses object image data and extruder head path data that correspond to different arrangements of the extrusion material prior to operate the extruder head and form each arrangement of the extrusion material. As described below, the controller optionally adjusts the operation of the valve assembly to form multiple arrangements of thermoplastic material through one or more nozzles during a three-dimensional printing operation.

As used herein, the term "process direction" refers to a direction of relative movement between an extruder head and an image receiving surface that receives thermoplastic material extruded from one or more nozzles in the head. The image receiving surface is either a support member that holds a three-dimensional printed object or a surface of the partially formed three-dimensional object during an additive manufacturing process. In the illustrative embodiments described herein, one or more actuators move the extruder head about the support member, but alternative system embodiments move the support member to produce the relative motion in the process direction while the extruder head remains stationary. Some systems use a combination of both systems for different axes of motion.

As used herein, the term "cross process direction" refers to an axis that is perpendicular to the process direction in the plane of the process direction. The process direction and cross-process direction refer to the relative path of movement of the extruder head and the surface that receives the thermoplastic material. In some configurations, the extruder head includes an array of nozzles that extend along the cross-process direction. Adjacent nozzles within the extruder head are separated by a predetermined distance in the cross-process direction. In some configurations the system rotates the extruder head to adjust the effect cross-process direction distance that separates different nozzles in the extruder head to adjust the corresponding cross-process direction distance that separates arrangements of the thermoplastic material that are extruded from the nozzles in the extruder head.

During operation of the additive manufacturing system, an extruder head moves in the process direction along both straight and curved paths relative to a surface that receives thermoplastic material during the three-dimensional object printing process. Additionally, an actuator in the system optionally rotates the extruder head about the Z axis to adjust the effective cross-process distance that separates nozzles in the extruder head to enable the extruder head to form two or more arrangements of thermoplastic material with predetermined distances between each arrangement of the thermoplastic material. The extruder head moves both along the outer perimeter to form outer walls of a two-dimensional region in a layer of the printed object and within the perimeter to fill all or a portion of the two-dimensional region with the thermoplastic material.

Figure 4:
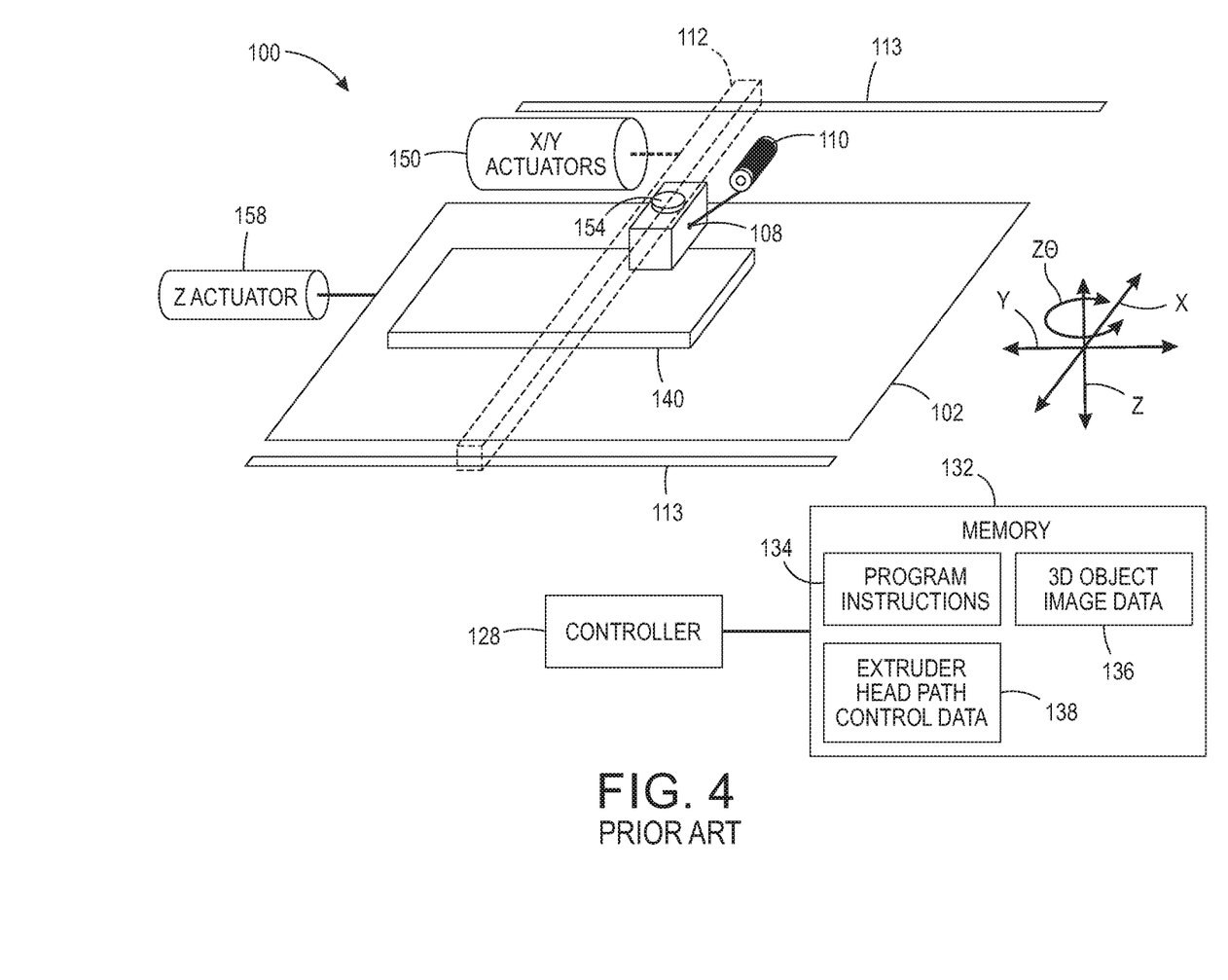
FIG. 4 is a diagram of a prior art three-dimensional object printer having a multi-nozzle extrusion printhead that does not have the solid extrusion material feeding system of FIG. 1.

FIG. 4 depicts a prior art three-dimensional object additive manufacturing system or printer 100 that is configured to operate an extruder head 108 to form a three-dimensional printed object 140. Although the printer 100 is depicted as a printer that uses planar motion to form an object, other printer architectures can be used with the extruder head and mechanical mover of extrusion material described in this document. These architectures include delta-bots, selective compliance assembly robot arms (SCARAs), multi-axis printers, non-Cartesian printers, and the like. The printer 100 includes a support member 102, a multi-nozzle extruder head 108, extruder head support arm 112, controller 128, memory 132, X/Y actuators 150, an optional Zθ actuator 154, and a Z actuator 158. In the printer 100, the X/Y actuators 150 move the extruder head 108 to different locations in a two-dimensional plane (the "X-Y plane") along the X and Y axes to extrude arrangements of thermoplastic material that form one layer in a three-dimensional printed object, such as the object 140 that is depicted in FIG. 4. For example, in FIG. 4 the X/Y actuators 150 translate the support arm 112 and extruder head 108 along guide rails 113 to move along the Y axis while the X/Y actuators 150 translate the extruder head 108 along the length of the support arm 112 to move the printhead along the X axis. The extruded patterns include both outlines of one or more regions in the layer and swaths of the thermoplastic material that fill in the regions within the outline of thermoplastic material patterns. The Z actuator 158 controls the distance between the extruder head 108 and the support member 102 along the Z axis to ensure that the nozzles in the extruder head 108 remain at a suitable height to extrude thermoplastic material onto the object 140 as the object is formed during the printing process. The Zθ actuator 154 controls an angle of rotation of the extruder head 108 about the Z axis (referenced as Zθ in FIG. 4) for some embodiments of the extruder head 108 that rotate about the Z axis. This movement controls the separation between nozzles in the extruder head 108, although some extruder heads do not require rotation during the manufacturing process. In the system 100, the X/Y actuators 150, Zθ actuator 154, and the Z actuator 158 are embodied as electromechanical actuators, such as electric motors, stepper motors, or any other suitable electromechanical device. In the illustrative embodiment of FIG. 4, the three-dimensional object printer 100 is depicted during formation of a three-dimensional printed object 140 that is formed from a plurality of layers of thermoplastic material.

The support member 102 is a planar member, such as a glass plate, polymer plate, or foam surface, which supports the three-dimensional printed object 140 during the manufacturing process. In the embodiment of FIG. 4, the Z actuator 158 also moves the support member 102 in the direction Z away from the extruder head 108 after application of each layer of thermoplastic material to ensure that the extruder head 108 maintains a predetermined distance from the upper surface of the object 140. The extruder head 108 includes a plurality of nozzles and each nozzle extrudes thermoplastic material onto the surface of the support member 102 or a surface of a partially formed object, such the object 140. In the example of FIG. 4, extrusion material is provided as a filament from extrusion material supply 110, which is a spool of ABS plastic or another suitable extrusion material filament that unwraps from the spool to supply extrusion material to the extruder head 108.

The support arm 112 includes a support member and one or more actuators that move the extruder head 108 during printing operations. In the system 100, one or more actuators 150 move the support arm 112 and extruder head 108 along the X and Y axes during the printing operation. For example, one of the actuators 150 moves the support arm 112 and the extruder head 108 along the Y axis while another actuator moves the extruder head 108 along the length of the support arm 112 to move along the X axis. In the system 100, the X/Y actuators 150 optionally move the extruder head 108 along both the X and Y axes simultaneously along either straight or curved paths. The controller 128 controls the movements of the extruder head 108 in both linear and curved paths that enable the nozzles in the extruder head 108 to extrude thermoplastic material onto the support member 102 or onto previously formed layers of the object 140. The controller 128 optionally moves the extruder head 108 in a rasterized motion along the X axis or Y axis, but the X/Y actuators 150 can also move the extruder head 108 along arbitrary linear or curved paths in the X-Y plane.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102 and the support arm 112. The controller 128 is also operatively connected to a memory 132. In the embodiment of the printer 100, the memory 132 includes volatile data storage devices, such as random access memory (RAM) devices, and non-volatile data storage devices such as solid-state data storage devices, magnetic disks, optical disks, or any other suitable data storage devices. The memory 132 stores programmed instruction data 134 and three-dimensional (3D) object image data 136. The controller 128 executes the stored program instructions 134 to operate the components in the printer 100 to form the three-dimensional printed object 140 and print two-dimensional images on one or more surfaces of the object 140. The 3D object image data 136 includes, for example, a plurality of two-dimensional image data patterns that correspond to each layer of thermoplastic material that the printer 100 forms during the three-dimensional object printing process. The extruder head path control data 138 include a set of geometric data or actuator control commands that the controller 128 processes to control the path of movement of the extruder head 108 using the X/Y actuators 150 and to control the orientation of the extruder head 108 using the Zθ actuator 154. The controller 128 operates the actuators to move the extruder head 108 above the support member 102 as noted above while the head extrudes thermoplastic material to form an object.

Figure 1:
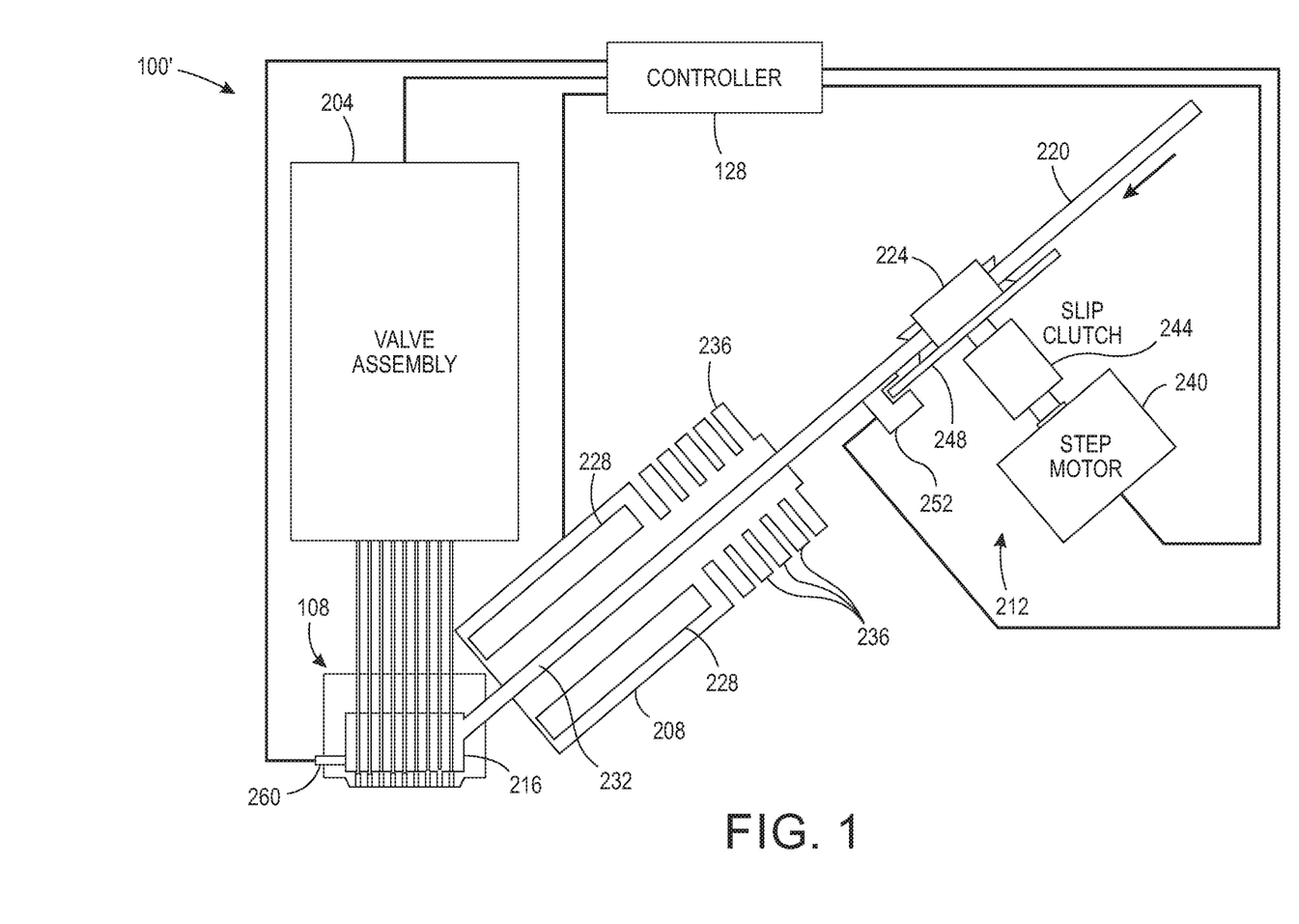
FIG. 1 depicts an additive manufacturing system that includes a solid extrusion material feeding system that maintains pressure of thermoplastic material within a manifold of an extruder head within a predetermined range.

FIG. 1 depicts an additive manufacturing system 100' that includes an actuator assembly 204 in the extruder head 108 that is operatively connected to the controller 128 that is operated to control the opening and closing of the valves for emitting thermoplastic material from the plurality of nozzles in the extruder head 108. Specifically, the controller 128 activates and deactivates different actuators in the assembly 204 connected to the valves in the extruder head 108 to emit thermoplastic material and form arrangements of the thermoplastic material in each layer of the three-dimensional printed object 140. System 100' also includes an extrusion material dispensing system 212 that feeds filament from the supply 110 to the heater 208 at a rate that maintains the pressure of the thermoplastic material in the manifold 216 within a predetermined range during operation of the system 100'. The dispensing system 212 is one embodiment that is suitable for regulating pressure of the thermoplastic material in the manifold. Additionally, the controller 128 is operatively connected to an actuator in the dispensing system 212 to control the rate at which the dispensing system 212 delivers solid filament to a heater 208. The heater 208 softens or melts extrusion material filament 220 fed to the heater 208 via drive roller 224. Actuator 240 drives the roller 224 and is operatively connected to the controller 128 so the controller can regulate the speed at which the actuator drives the roller 224. Another roller opposite roller 224 is freewheeling so it follows the rate of rotation at which roller 224 is driven. While FIG. 1 depicts a feed system that uses an electromechanical actuator and the driver roller 224 as a mechanical mover to move the filament 220 into the heater 208, alternative embodiments use one or more actuators to operate a mechanical mover in the form of a rotating auger or screw. The auger or screw moves solid phase extrusion material in the form of extrusion material powder or pellets into the heater 208.

In the embodiment of FIG. 1, the heater 208 is formed from stainless steel and includes one or more heating elements 228, such as electrically resistive heating elements, which are operatively connected to the controller 128. Controller 128 is configured to connect the heating elements 228 to electrical current selectively to soften or melt the filament of extrusion material 220 in channel 232 within the heater 208. While FIG. 1 shows heater 208 receiving extrusion material in a solid phase as solid filament 220, in alternative embodiments, it receives the extrusion material in solid phase as powdered or pelletized extrusion material. Cooling fins 236 attenuate heat in the channel 232 upstream from the heater 208. A portion of the extrusion material that remains solid in the channel 232 at or near the cooling fins 236 forms a seal in the channel 232 that prevents thermoplastic material from exiting the heater from any other opening than the connection to the manifold 216. The extruder head 108 can also include additional heating elements to maintain an elevated temperature for the thermoplastic material within the manifold 216. In some embodiments, a thermal insulator covers portions of the exterior of the extruder head 108 to maintain a temperature within the manifold 216.

To maintain a fluid pressure of the thermoplastic material within the manifold 216 within a predetermined range, avoid damage to the extrusion material, and control the extrusion rate through the nozzles, a slip clutch 244 is operatively connected to the drive shaft of the actuator 240. As used in this document, the term "slip clutch" refers to a device applies frictional force to an object to move the object up to a predetermined set point. When the range about the predetermined set point for the frictional force is exceeded, the device slips so it no longer applies the frictional force to the object. The slip clutch enables the force exerted on the filament 220 to remain constant no matter how many valves are opened or how fast the actuator 240 drives roller 224. This constant force can be maintained by either driving the actuator 240 at a speed that is higher than the fastest expected rotational speed of the filament drive roller 224 or by putting an encoder wheel 248 on the roller 224 and sensing the rate of rotation with a sensor 252.

The signal generated by the sensor 252 indicates the angular rotation of the roller 224 and the controller 128 receives this signal to identify the speed of the roller 224. The controller 128 is further configured to adjust the signal provided to the actuator 240 to control the speed of the actuator. When the controller is configured to control the speed of the actuator 240, the controller 128 operates the actuator 240 so its speed is slightly faster than the rotation of the roller 224. This operation ensures that the torque on the drive roller 224 is always a function of the slip clutch torque. If one valve/nozzle combination is open, the filament 220 moves slowly. If all of the actuator/valve combinations in the assembly 204 are opened, the filament begins to move more quickly and the controller 128 immediately operates the actuator 240 to increase its speed to ensure that the output shaft of the actuator is turning faster than the speed of the roller 224 indicated by the sensor 252. A delay inherently exists between the force applied to the filament and the pressure of the thermoplastic material in the nozzle region of the extruder header. Empirical data of these delays enable set points to be defined for the slip clutch that enable the slip clutch to be operated to provide more uniform pressure of the thermoplastic material in the nozzle region of the extruder head.

The signal generated by the sensor 252 can also be used by the controller 128 to regulate other aspects of the actuator 240. For example, the rate of feeding the filament to the heater of the additive manufacturing system can be regulated to be proportional to the amount of thermoplastic material to be extruded by the extruder head. By controlling the torque set point of the slip clutch, the controller can maintain the proportional constant at 1 or slightly higher. Compensating for fluctuations outside of a predetermined range about the proportional constant of 1 is performed when clutch slips with reference to the torque set point for the clutch in response to too much material being fed to the heater and extruder head. This type of control can be used to regulate the rotation of the output shaft of the actuator.

Figure 2:
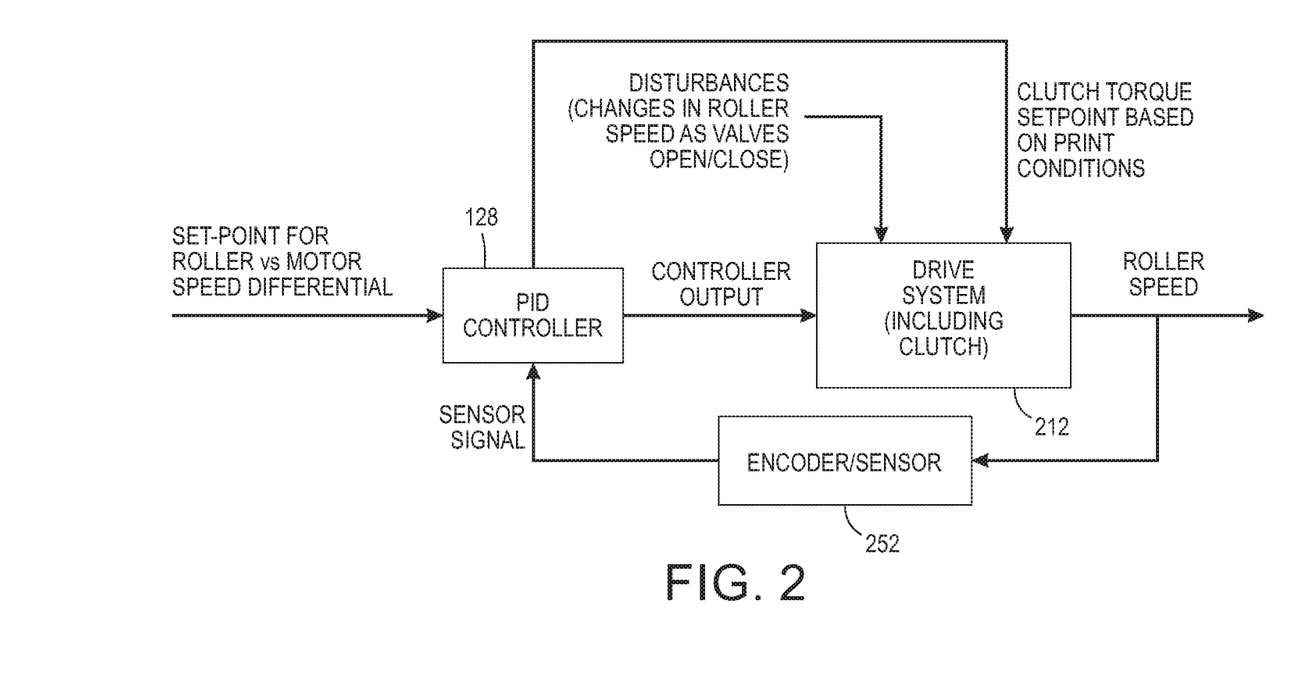
FIG. 2 is a block diagram of a feedback system implemented by the controller in the system of FIG. 1.

In some embodiments, the torque level for the slip clutch 244 is empirically determined and set for operation of the system 100'. In other embodiments, as noted above, a sensor 252 generates a signal that identifies the rotational speed of the roller 224 and the controller 128 is further configured to use the signal from the sensor 252 to adjust the signal from the controller that operates the actuator 240. In the embodiments that have this feedback loop, the feedback system can be configured as shown in FIG. 2 where the controller 128 implements a proportion-integral-derivative (PID) controller that adjusts the operation of the actuator 240 with reference to the signal indicative of the rotational speed of the roller 224. This system is used to reduce the total number of cycles in which the slip clutch slips. As noted above, the actuator 240 only needs to drive its output shaft at a rate that is slightly faster than the rotational rate of the roller 224. This type of operation helps keep the slip clutch engaged so the number of times the clutch slips is minimized and the life of the clutch is extended.

The controller 128 has a set point stored in memory connected to the controller that identifies the slightly higher speed of the actuator output shaft over the rotational speed of the roller 224. As used in this document, the term "set point" means a parameter value that a controller uses to operate components to keep the parameter corresponding to the set point within a predetermined range about the set point. For example, the controller 128 changes a signal that operates the actuator 240 to rotate the output shaft at a speed identified by the output signal in a predetermined range about the set point. In addition to the commanded speed for the actuator, the number of valves opened or closed in the actuator assembly 204 and the torque set point for the clutch also affect the filament drive system 212 operation. The resulting rotational speed of the roller 224 is identified by the signal generated by the sensor 252. The PID controller of controller 128 identifies an error from this signal with reference to the differential set point stored in memory and adjusts the signal output by the controller to operate the actuator 240. Alternatively, the controller 128 can alter the torque level for the slip clutch or the controller 128 can both alter the torque level and adjust the signal with which the controller operates the actuator.

Figure 3:
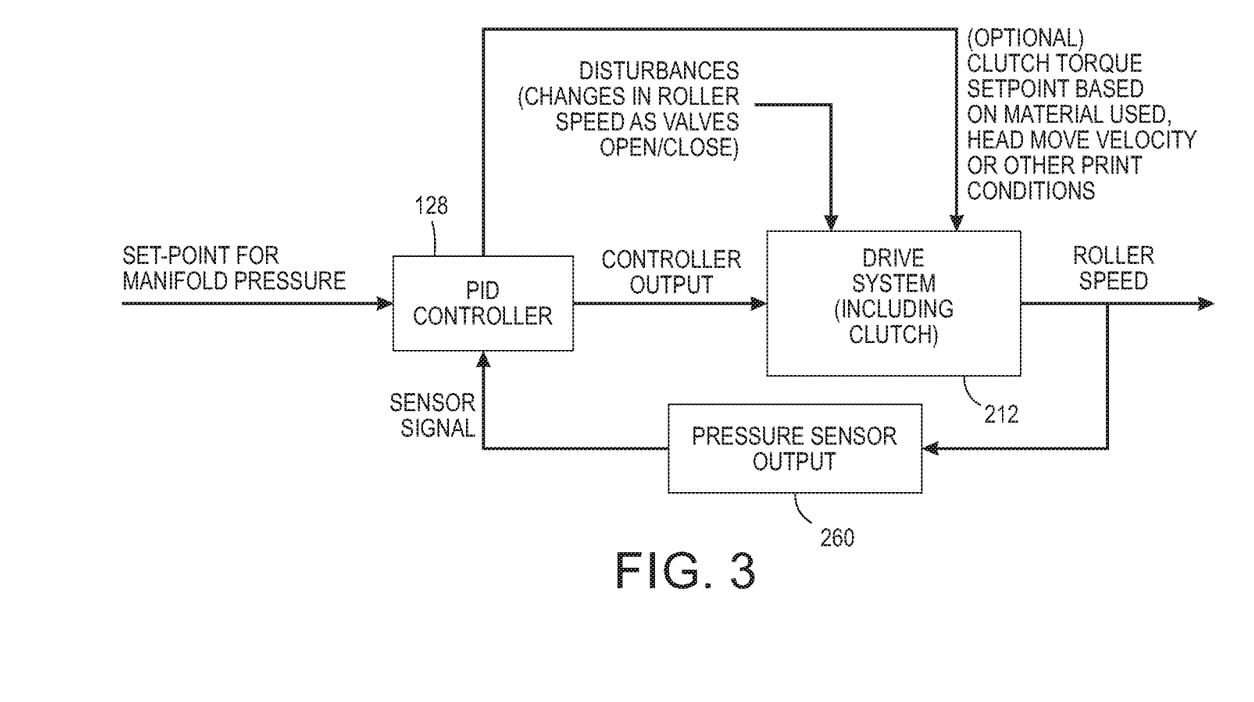
FIG. 3 is a block diagram of an alternative feedback system implemented by the controller in the system of FIG. 1.

An alternative embodiment of the feedback control system is shown in FIG. 3. In this embodiment, the controller 128 has been configured to implement a proportion-integral-derivative (PID) controller that adjusts the operation of the actuator 240 with reference to a signal indicative of the pressure of the thermoplastic material in the manifold 216. For that purpose, a pressure sensor 260 (FIG. 1) is positioned to sense the pressure of the thermoplastic material in the manifold 216 and the signal indicative of the pressure level generated by the sensor can be used by the PID controller of FIG. 2 to adjust the output signal for operation of the actuator 240. This system is also used to reduce the total number of cycles in which the slip clutch slips. The controller 128 has a set point stored in memory connected to the controller that identifies a pressure for the thermoplastic material in the manifold 216. The controller 128 outputs a signal that operates the actuator 240 to rotate the output shaft at a speed identified by the output signal. In addition to the commanded speed for the actuator, the number of valves opened or closed in the actuator assembly 204 and the torque set point for the clutch also affect the filament drive system 212 operation. The pressure of the thermoplastic material in the manifold 216 is identified by the signal generated by the sensor 260. The PID controller of controller 128 identifies an error from this signal with reference to the pressure set point and adjusts the signal output by the controller to the actuator 240. Alternatively, the controller 128 can alter the torque level for the slip clutch or the controller 128 can both alter the torque level and adjust the signal with which the controller operates the actuator.

The slip clutch 244 can be a fixed or adjustable torque friction disc clutch, a magnetic particle clutch, a magnetic hysteresis clutch, a ferro-fluid clutch, an air pressure clutch, or permanent magnetic clutch. The clutch types that operate magnetically can have their torque set points adjusted by applying a voltage to the clutches. This feature enables the torque set point on the clutch to be changed with reference to print conditions. The term "print conditions" refers to parameters of the currently ongoing manufacturing operation that affect the amount of thermoplastic material required in the manifold for adequate formation of the object. These print conditions include the type of extrusion material being fed to the extruder head, the temperature of the thermoplastic material being emitted from the extruder head, the speed at which the extruder head is being moved in the X-Y plane, the position of the feature being formed on the object, and the like.

In the embodiments having the pressure sensor 260, the controller 128 can be further configured to monitor the pressure within the manifold 216. If the pressure is greater than expected for the number of valves opened at a particular time, the controller detects the condition as an indication of clogged nozzles. In the embodiments having the rotational speed sensor 252, the rotational rate of the roller is monitored and if the rate of rotation of the roller 224 is less than expected for the number of valves opened at a particular time, the controller 128 detects the condition as an indication of clogged nozzles. In either embodiment, the controller 128 can generate an alarm and take the system offline for maintenance. The extrusion feeding system 212 can also be operated before any nozzles are opened to establish a predetermined pressure in a manifold in a predetermined range. Moreover, if the extruder head 108 will not be operated for some significant period of time, the torque level for the slip clutch can be set to zero or near zero while depressurizing the extruder head.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An apparatus comprising:
   an extruder head having a manifold within the extruder head that is configured to store thermoplastic material and at least one nozzle fluidly connected with the manifold to enable thermoplastic material to flow from the manifold and be emitted from the at least one nozzle;
   a heater having a channel into which a filament of extrusion material can enter and at least one heating element configured to thermally treat the filament of extrusion material in the channel to melt the filament of extrusion material in a portion of the channel closest to the manifold while the filament of extrusion material remains solid in another portion of the channel to form thermoplastic material in the portion of the channel closest to the manifold, the channel in the heater being fluidly connected to the manifold in the extruder head to enable the thermoplastic material to flow from the channel in the heater and enter the manifold;
   an actuator having an output shaft;
   a mechanical mover operatively connected to the output shaft of the actuator to enable the actuator to operate the mechanical mover, the mechanical mover being positioned to apply a force to the filament of extrusion material prior to the filament of extrusion material entering the channel of the heater and move the filament of extrusion material into the channel in the heater when the actuator operates the mechanical mover;
   a slip clutch operatively connected to the output shaft of the actuator to limit a force exerted by the mechanical mover on the filament of extrusion material being moved into the channel of the heater;
   a sensor configured to generate a signal indicative of a pressure of the thermoplastic material within the manifold; and
   a controller operatively connected to the sensor and the actuator, the controller being configured to adjust a rotation rate of the output shaft of the actuator using the signal generated by the sensor and to adjust a torque set point of the slip clutch with reference to print conditions.

2. The apparatus of claim 1 wherein the print conditions are one or more of a type of extrusion material being moved to the heater, a temperature of the thermoplastic material, a speed at which the extruder head is being moved, and a position of a feature being formed on the object.

3. The apparatus of claim 1 wherein the mechanical mover is a roller.

4. The apparatus of claim 1 wherein the slip clutch is one of a torque friction disc clutch, a magnetic particle clutch, a magnetic hysteresis clutch, a ferro-fluid clutch, an air pressure clutch, or a permanent magnetic clutch.

5. The apparatus of claim 1 further comprising:
   at least one valve operatively connected between the at least one nozzle and the manifold, the at least one valve being configured to open a channel between the manifold and the at least one nozzle selectively; and the controller being further configured to operate the at least one valve to extrude thermoplastic material from the at least one nozzle selectively.

6. The apparatus of claim 1, the controller being further configured to:
   operate the actuator to produce a pressure of the thermoplastic material in the manifold in a predetermined range before the controller operates the extruder head to form an object with the thermoplastic material.

7. The apparatus of claim 1, the controller being further configured to:
   adjust a pressure set point for operating the actuator with reference to print conditions.

8. The apparatus of claim 7 wherein the print conditions are one or more of a type of extrusion material being moved to the heater, a temperature of the thermoplastic material, a speed at which the extruder head is being moved, and a position of a feature being formed on the object.

9. An apparatus comprising:
   an extruder head having a manifold within the extruder head that is configured to store thermoplastic material and at least one nozzle fluidly connected with the manifold to enable thermoplastic material to flow from the manifold and be emitted from the at least one nozzle;
   a heater having a channel into which a filament of extrusion material can enter and at least one heating element configured to thermally treat the filament of extrusion material in the channel to melt the filament of extrusion material in a portion of the channel closest to the manifold while the filament of extrusion material remains solid in another portion of the channel to form thermoplastic material in the portion of the channel closest to the manifold, the channel in the heater being fluidly connected to the manifold in the extruder head to enable the thermoplastic material to flow from the channel in the heater and enter the manifold;
   an actuator having an output shaft;
   a mechanical mover operatively connected to the output shaft of the actuator to enable the actuator to operate the mechanical mover, the mechanical mover being positioned to apply a force to the filament of extrusion material prior to the filament of extrusion material entering the channel of the heater and move the filament of extrusion material into the channel in the heater when the actuator operates the mechanical mover;
   a slip clutch operatively connected to the output shaft of the actuator to limit a force exerted by the mechanical mover on the filament of extrusion material being moved into the channel of the heater;
   a sensor configured to generate a signal indicative of a pressure of the thermoplastic material within the manifold; and
   a controller operatively connected to the sensor and the actuator, the controller being configured to adjust a rotation rate of the output shaft of the actuator using the signal generated by the sensor and to detect a clogging of the at least one nozzle with reference to a signal generated by another sensor that is indicative of a pressure in the manifold or a speed of the output shaft of the actuator and adjust a speed of the mechanical mover and a torque set point of the slip clutch in response to detection of the clogging of the at least one nozzle.

10. An apparatus comprising:
    an extruder head having a manifold within the extruder head that is configured to store thermoplastic material and at least one nozzle fluidly connected with the manifold to enable thermoplastic material to flow from the manifold and be emitted from the at least one nozzle;
    a heater having a channel into which a filament of extrusion material can enter and at least one heating element configured to thermally treat the filament of extrusion material in the channel to melt the filament of extrusion material in a portion of the channel closest to the manifold while the filament of extrusion material remains solid in another portion of the channel to form thermoplastic material in the portion of the channel closest to the manifold, the channel in the heater being fluidly connected to the manifold in the extruder head to enable the thermoplastic material to flow from the channel in the heater and enter the manifold;
    an actuator having an output shaft;
    a mechanical mover operatively connected to the output shaft of the actuator to enable the actuator to operate the mechanical mover, the mechanical mover being positioned to apply a force to the filament of extrusion material prior to the filament of extrusion material entering the channel of the heater and move the filament of extrusion material into the channel in the heater when the actuator operates the mechanical mover;
    a sensor configured to generate a signal indicative of a rate at which the mechanical mover rotates;
    a slip clutch operatively connected to the output shaft of the actuator to limit a force exerted by the mechanical mover on the filament of extrusion material being moved into the channel of the heater; and
    a controller operatively connected to the sensor and the actuator, the controller being configured to adjust a rotation rate of the output shaft of the actuator using the signal generated by the sensor so rotation of the output shaft of the actuator is maintained at a rate that is greater than the rate at which the mechanical mover rotates.

* * * * *